US012778020B2

(12) United States Patent
Afting et al.

(10) Patent No.: US 12,778,020 B2
(45) Date of Patent: Nov. 3, 2026

(54) FIELD PROCESSING MACHINE WITH A PICKUP DEVICE WHICH HAS A PICKUP ROTOR AND A TRANSFER ROTOR

(71) Applicant: Maschinenfabrik Bernard Krone GmbH & Co. KG, Spelle (DE)

(72) Inventors: Andreas Afting, Emsbüren (DE); Christian Osthues, Horstel (DE); Jan Horstmann, Rheine (DE); Josef Horstmann, Ibbenbüren (DE); Sebastian Hassig, Voltlage (DE)

(73) Assignee: Maschinenfabrik Bernard Krone GmbH & Co. KG, Spelle (DE)

( * ) Notice: Subject to any disclaimer, the term of this patent is extended or adjusted under 35 U.S.C. 154(b) by 410 days.

(21) Appl. No.: 18/502,579

(22) Filed: Nov. 6, 2023

(65) Prior Publication Data

US 2024/0147909 A1 May 9, 2024

(30) Foreign Application Priority Data

Nov. 9, 2022 (DE) ........................ 102022129616.4

(51) Int. Cl.
*A01D 89/00* (2006.01)

(52) U.S. Cl.
CPC ................................. *A01D 89/002* (2013.01)

(58) Field of Classification Search
CPC .................................................... A01D 89/002
See application file for complete search history.

(56) References Cited

U.S. PATENT DOCUMENTS 4,524,575 A * 6/1985 Nilsen .................... A01D 84/00
56/372
2012/0304612 A1 12/2012 Roberge
(Continued)

FOREIGN PATENT DOCUMENTS

DE 19501382 A1 7/1996
DE 102010010862 A1 9/2011
(Continued)

OTHER PUBLICATIONS

English translation of DE-202020104789-U1 (Year: 2020).*
(Continued)

*Primary Examiner* — Claude J Brown
(74) *Attorney, Agent, or Firm* — McKee, Voorhees & Sease, PLC

(57) ABSTRACT

A field cultivating machine (1) having at least one pickup device (10), having a pickup rotor (11) and a transfer rotor (14), which can be driven about axes of rotation (A, B) along a transverse axis (Y), wherein the pickup rotor (11) can pick up agricultural crop material from the ground (70) with pickup prongs (12), to lift it in relation to a vertical axis (Z) and to transfer it to the transfer rotor (14), which is configured to take over the crop material by means of transfer prongs (15) and to transfer it to a downstream device (30), at least in part behind the pickup device (10) in relation to a longitudinal axis (X), wherein the transfer prongs (15) engage between the pickup prongs (12) so that the that ranges of movement (C, D) of the transfer prongs (15) and the pickup prongs (12) overlap when viewed along the transverse-axis (Y).

17 Claims, 7 Drawing Sheets

(56) References Cited

U.S. PATENT DOCUMENTS

| | | | | |
|---|---|---|---|---|
| 2013/0219847 | A1* | 8/2013 | Miller | A01D 43/08<br>56/156 |
| 2016/0309655 | A1* | 10/2016 | Treffer | A01D 43/04 |
| 2016/0366826 | A1* | 12/2016 | Cox | A01D 89/002 |
| 2018/0132420 | A1* | 5/2018 | Nafziger | A01D 57/20 |
| 2019/0191628 | A1* | 6/2019 | Graham | A01D 29/00 |

FOREIGN PATENT DOCUMENTS

| | | | | | |
|---|---|---|---|---|---|
| DE | 102014226267 | A1 | * | 7/2016 | A01F 12/26 |
| DE | 202017000595 | U1 | | 5/2018 | |
| DE | 202020104789 | U1 | * | 8/2020 | A01D 89/008 |
| EP | 3987915 | A1 | * | 4/2022 | A01D 90/04 |
| EP | 4059339 | A1 | * | 9/2022 | A01D 90/02 |
| WO | 2013034480 | A1 | | 3/2013 | |
| WO | WO-2016094270 | A1 | * | 6/2016 | A01D 57/20 |

OTHER PUBLICATIONS

English translation of DE-102014226267-A1 (Year: 2016).*
English translation of EP-3987915-A1 (Year: 2022).*
English translation of EP-4059339-A1 (Year: 2022).*

* cited by examiner

FIELD PROCESSING MACHINE WITH A PICKUP DEVICE WHICH HAS A PICKUP ROTOR AND A TRANSFER ROTOR

CROSS REFERENCE TO RELATED APPLICATIONS

This application claims priority under 35 U.S.C. § 119 to German Patent Application DE 10 2022 129616.4, filed Nov. 9, 2022, which is herein incorporated by reference in its entirety, including without limitation, the specification, claims, and abstract, as well as any figures, tables, appendices, or drawings thereof.

FIELD OF THE INVENTION

The present invention relates to a field cultivating machine.

BACKGROUND OF THE INVENTION

The background description provided herein gives context for the present disclosure. Work of the presently named inventors and aspects of the description that may not otherwise qualify as prior art at the time of filing are neither expressly nor impliedly admitted as prior art.

Various agricultural machines, such as windrowers, balers, or self-loading forage boxes, pick up crop material, e.g., grass or hay, lying on the ground during cultivation in order, for example, to process it, transport it away or—in the case of a windrower—to move it and deposit it at some other point. To pick up the crop material, a pickup device or pickup can be used, and this is generally arranged at the front of the agricultural machine and is guided over the ground with a small clearance. The crop material is lifted off the ground by means of a pickup rotor, which rotates about an axis extending in the transverse direction. The crop material picked up can be transferred directly to a downstream device, and transfer is assisted in some cases by a second rotor. In the case of a belt-type windrower, the crop material is transferred to a transverse conveyor, which conveys the crop material by means of a conveyor belt or the like transversely to the direction of travel and deposits it again at the side. Depending on the quantity and characteristics of the crop material, problems may be encountered in picking up, conveying, and transferring the crop material by means of the pickup device, and these may disrupt the flow of crop material and/or lead to impairment of the quality of the crop material.

One problem is that the prongs of the pickup rotor move close to the ground counter to the direction of travel, and only as rotation progresses do they move upwards and then rearwards counter to the direction of travel. The unavoidable movement counter to the direction of travel can lead to the crop material being pushed or flung forwards. As a result, the crop material may pile up and be contaminated or squashed as it is pushed along. Moreover, it may come into contact with the prongs several times in succession, multiplying the risk of damage. If an additional rotor for transfer to the downstream device is used, problems may also occur during the transfer from one rotor to the other rotor, as a result of which there may be a build-up of crop material. Finally, it may happen that the crop material is not discharged to the downstream device but adheres to the rotor and continues to be taken along. These irregularities too increase the risk of damage to the crop material and impair the efficiency of the agricultural machine.

DE 20 2017 000 595 U1 discloses an agricultural harvesting machine, in particular a merger, self-loading forage box or baler, having a crop conveyor for picking up and conveying crop material in the form of stalks and/or leaves, comprising a spiked rotor which has conveying prongs that are driven in a revolving manner, are arranged between strippers and are at least partially retracted between the strippers along one section of their path of revolution, and having an additional conveying rotor in the deposition region of the spiked rotor for onward conveyance of the crop material stripped off the conveying prongs. In this case, the additional conveying rotor has take-along sections which engage between the conveying prongs of the spiked rotor.

Therefore, there is a strong need for an efficient and gentle pickup and transfer of crop material lying on the ground.

SUMMARY OF THE INVENTION

The following objects, features, advantages, aspects, and/or embodiments are not exhaustive and do not limit the overall disclosure. No single embodiment needs to provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

An aspect of the invention is a field cultivating machine having at least one pickup device, which has a pickup rotor and a transfer rotor, which can be driven in the same direction about axes of rotation which extend at least predominantly along a transverse axis, wherein the pickup rotor is configured to pick up agricultural crop material from the ground by means of pickup prongs, to lift it in relation to a vertical axis and to transfer it to the transfer rotor, which is configured to take over the crop material by means of transfer prongs and to transfer it to a downstream device, which is arranged at least in part behind the pickup device in relation to a longitudinal axis, wherein the transfer prongs engage between the pickup prongs in such a way that ranges of movement of the transfer prongs and the pickup prongs overlap when viewed along the transverse axis, wherein the pickup device has a stripping device with pickup-prong stripper sections and pickup-prong gaps, which are formed therebetween in relation to the transverse axis and through which the pickup prongs at least partially project, that includes that the stripping device has transfer-prong stripper sections and transfer-prong gaps formed therebetween, through which the transfer prongs at least partially project, wherein the transfer-prong stripper sections are designed in such a way that, as the transfer rotor rotates, the transfer prongs enter between them.

For this purpose, a field cultivating machine is provided having at least one pickup device, which has a pickup rotor and a transfer rotor, which can be driven in the same direction about axes of rotation which extend at least predominantly along a transverse axis, wherein the pickup rotor is configured to pick up agricultural crop material from the ground by means of pickup prongs, to lift it in relation to a vertical axis and to transfer it to the transfer rotor, which is configured to take over the crop material by means of transfer prongs and to transfer it to a downstream device, which is arranged at least in part behind the pickup device in relation to a longitudinal axis, wherein the transfer prongs engage between the pickup prongs in such a way that ranges of movement of the transfer prongs and the pickup prongs overlap when viewed along the transverse axis, wherein the pickup device has a stripping device with pickup-prong stripper sections and pickup-prong gaps, which are formed therebetween in relation to the transverse axis and through which the pickup prongs at least partially project.

The field cultivating machine is used in the broadest sense for field cultivation. To be more precise, it is used, on the one hand, to pick up agricultural crop material, e.g., grass or hay, from the ground. Depending on the embodiment, the crop material can be further processed (e.g., cut), accommodated in the field cultivating machine, and/or deposited back on the ground. The field cultivating machine can be designed, for example, as an agricultural machine with its own undercarriage, e.g., as a baler, forage harvester, or self-loading forage box. It can have its own travel drive, or it can be provided for towing by a tractor. However, it can also be designed, for example, as an attachment which is carried at the front or rear by a tractor or the like and does not have an undercarriage which would be configured to constantly support its weight. The field cultivating machine has a pickup device, which can also be referred to as a pickup. This can be permanently connected to a vehicle body or main frame of the field cultivating machine or else can belong to a module which is connected to the vehicle body or main frame when required.

The pickup device has a pickup rotor and a transfer rotor, which can be driven in the same direction about axes of rotation, which extend at least predominantly along a transverse axis. The transverse axis and the vertical and longitudinal axes mentioned below can be regarded as axes of the pickup device and/or as axes of the field cultivating machine. At least in the operating state, the longitudinal axis is normally parallel or anti-parallel to the direction of travel, while the transverse axis is horizontal and perpendicular to the longitudinal axis, and the vertical axis is vertical. In particular, the axes of rotation of the two rotors can be parallel to one another. They extend at least predominantly along the transverse axis; that is to say, they are either parallel to the transverse axis or non-parallel to the latter, while the main component of their direction of extent is nevertheless parallel to the transverse axis. In general, the angle between an axis of rotation and the transverse axis is at most 30° or at most 20°. Embodiments in which each rotor is split in two with respect to the transverse axis are conceivable, in which case the rotor halves can be tilted relative to one another. In this case, the alignment of the axis of rotation in the two rotor halves is different but, overall, it is predominantly along the transverse axis. The rotors can be driven in the same direction. It may also be stated that the field cultivating machine and/or the pickup device are configured to drive the rotors in the same direction, that is to say, in the same direction of rotation.

The pickup rotor is configured to pick up agricultural crop material from the ground by means of pickup prongs, to lift it in relation to a vertical axis and to transfer it to the transfer rotor. The transfer prongs extend outwards in a radial direction in relation to the axis of rotation of the pickup rotor. They can be arranged on a common rotor core, which is rotatable about the axis of rotation. The pickup prongs are not subject to control, that is to say, they are connected—e.g., via the rotor core—in such a way that they cannot rotate relative to one another, but they may be capable of elastic deflection. The pickup prongs can be made of metal but may also be made of other materials, such as plastic or composites. In particular, they can be formed by wire or rods. As an alternative, they could also be formed by sheet metal or comparable sheet-like material. The pickup rotor can be guided along the ground with a small clearance, wherein the pickup prongs pick up the crop material and take it along. In accordance with the rotary motion of the pickup rotor, the crop material is lifted in relation to the vertical axis, although, of course, the movement is not purely vertical; rather, a horizontal motion is superimposed on the lifting movement. Overall, however, the crop material is arranged clearly above the ground when it is transferred to the transfer rotor.

The transfer rotor is configured to take over the crop material by means of transfer prongs and to transfer it to a downstream device, which is arranged at least in part behind the pickup device in relation to the longitudinal axis. The statements made above in relation to the pickup prongs can also be applied to a large extent to the transfer prongs. In particular, they are also not subject to control, i.e., are connected so as to be non-rotatable relative to one another. However, formation of the transfer prongs from sheet metal or some other sheet-like material is preferred. Both the pickup prongs and the transfer prongs can be grouped in prong rings which comprise a plurality of prongs, the axial position of which coincides in relation to the axis of rotation. The transfer rotor takes over the crop material and transfers it to the downstream device. Between the point of take-over and that of transfer, the transfer rotor normally conveys the crop material rearwards in relation to the longitudinal axis, i.e., counter to the direction of travel. A vertical movement can be superimposed in turn on this horizontal movement. In this context, the term “downstream device” should be interpreted broadly. Thus, the downstream device may be of purely passive design, but generally, it has at least one active element for conveying and/or processing the crop material. In this context, the term “transfer” also includes throwing or dropping, where the crop material does not have any contact with the transfer rotor or with the downstream device in the meantime. Since the overall conveying movement is split between two rotors, both can be of comparatively small configuration. Thus, the diameter of the pickup rotor, to be more precise, the diameter of the range of movement of one of its pickup prongs, can be, in particular, between 40 cm and 70 cm. The selected diameter of the transfer rotor can be similar.

The transfer prongs engage between the pickup prongs in such a way that ranges of movement of the transfer prongs and the pickup prongs overlap when viewed along the transverse axis. The range of movement of a prong is the range through which the prong passes on account of the rotary motion of the rotor. This range of movement is rotationally symmetrical with respect to the axis of rotation of the rotor. When viewed in the direction of the axis of rotation, it is circular or annular. When viewed along the transverse axis, the ranges of movement of the transfer prongs and the pickup prongs overlap. As explained above, the alignment of the transverse axis differs only slightly, or not at all, from that of the axes of rotation. In general, cylindrical enveloping surfaces can be defined for the pickup prongs, on the one hand, and for the transfer prongs, on the other. These enveloping surfaces intersect. It is also possible to state that the sum of the radii of the ranges of movement of a pickup prong and of a transfer prong is greater than the distance between the axes of rotation of the two rotors. Thus, the transfer prongs engage in gaps which are formed between the pickup prongs along the transverse axis. In corresponding fashion, the pickup prongs engage in gaps which are formed between the transfer prongs along the transverse axis. The engagement in the gaps significantly improves the transfer of the crop material. The transfer prongs are capable of directly taking up crop material, which is still between the pickup prongs.

The pickup device has a stripping device with pickup-prong stripper sections and pickup-prong gaps, which are formed therebetween in relation to the transverse axis and through which the pickup prongs at least partially project. The pickup-prong stripper sections can be formed by individual elements, or they can be subsections of a single component. In general, they are manufactured from steel and can be of strip-shaped design, for example. Their function is to at least partially strip crop material from the pickup prongs when the latter moves along the pickup-prong stripper sections in the course of the rotary motion. During this process, the pickup prongs move through pickup-prong gaps, which are formed between the pickup-prong stripper sections. They project, at least in part, through the said gaps. Normally, it is envisaged that they enter or dip down fully between, i.e., are retracted between, the pickup-prong stripper sections in a certain region on their path of movement. They move away from an outer side of the stripping device, on which the crop material can be retained, to an inner side. Under certain circumstances, it would also be possible to conceive of embodiments in which the pickup prongs do not fully retract. In this case, crop material remaining in the region of the tips of the pickup prongs could be taken off by the transfer prongs.

According to the invention, the stripping device has transfer-prong stripper sections and transfer-prong gaps formed therebetween, through which the transfer prongs at least partially project, wherein the transfer-prong stripper sections are designed in such a way that, as the transfer rotor rotates, the transfer prongs enter between them. The function of the transfer-prong stripper sections in relation to the transfer prongs corresponds to that of the pickup-prong stripper sections in relation to the pickup prongs, that is to say, they strip the crop material from the transfer prongs when the latter moves along them. In particular, the transfer prongs are retracted fully between the transfer-prong strippers; that is to say, they fully enter the transfer-prong gaps. This allows or imposes complete stripping of the crop material. Even though a distinction is drawn between pickup-prong stripper sections and transfer-prong stripper sections, a pickup-prong stripper section can immediately adjoin a transfer-prong stripper section or even be formed integrally therewith. The pickup-prong gaps are offset from the transfer-prong gaps in relation to the transverse axis. This corresponds to the arrangement of the pickup prongs, which are likewise arranged offset from the transfer prongs in relation to the transverse axis.

The field cultivating machine according to the invention enables the crop material to be picked up and transferred in a manner which is highly efficient and gentle on the crop material. First of all, the pickup rotor can be made comparatively small since it does not have to convey the crop material over the entire distance in the direction of the downstream device but is complemented in this respect by the transfer rotor. A smaller pickup rotor means, in turn, that crop material lying on the ground, which is in the form of a mat or heap of a certain depth in front of the pickup rotor, is more likely to be conveyed upwards and rearwards along the longitudinal axis instead of being flung or pushed forwards. The latter means that the crop material is picked up less effectively and often has to be engaged several times by the pickup rotor. Moreover, this can lead to a comparatively large heap of crop material being pushed over the ground in front of the pickup rotor, something that can likewise contaminate and/or damage the crop material. Furthermore, the engagement of the transfer prongs between the pickup prongs assists in the efficient transfer of the crop material to the transfer rotor. At least some of the crop material can be taken over directly by the transfer rotor without having to be stripped off by the pickup-prong stripper sections. This too can contribute to the preservation of the crop material. Finally, the transfer-prong stripper sections prevent crop material from possibly being conveyed back in the direction of the pickup rotor by the transfer rotor instead of being transferred to the downstream device. Such return delivery would be disadvantageous and could lead to damage to the crop material and to clogging of parts of the pickup device.

In addition to the elements mentioned here, the pickup device can also have further elements, in particular ground guidance elements, by means of which it can be supported at least proportionately on the ground. The ground guidance elements serve, on the one hand, to transfer at least some of the weight of the pickup device to the ground, such that this is not absorbed elsewhere, e.g., by other parts of the field cultivating machine. In particular, however, the ground guidance elements serve, as it were to sense the ground profile and thus maintain an optimum clearance of the pickup device with respect to the ground. That is to say that the pickup device is guided along the ground profile by means of the ground guidance elements. In particular, the ground guidance elements could be wheels, rollers, rolls, or even skids.

As a general rule, the transfer rotor is arranged at least in part higher than the pickup rotor and is configured to at least initially lift the crop material taken over from the pickup rotor in relation to the vertical axis. That is to say that the crop material is conveyed upwards and thus lifted not only by the pickup rotor but also by the transfer rotor. In this context, “at least initially” refers to the phase of movement of the crop material, which follows take-over by the transfer rotor. Of course, the above-explained advantages of splitting the conveying section between two rotors also apply to the upward conveyance of the crop material. While preserving the crop material from damage and maintaining efficiency, it is possible to achieve a conveying height which allows advantageous options in respect of transfer to the downstream device.

The transfer prongs preferably have a transfer conveying profile which is arranged at the front in the direction of rotation and slopes rearwards, such that it recedes tangentially in a radially outward direction, and the pickup prongs have a pickup conveying profile which is arranged at the front in the direction of rotation and slopes forwards to a greater extent, at least in some region or regions, than the transfer conveying profile. Here, the direction of rotation is the direction in which the rotor is rotated in normal operation. The transfer conveying profile and the pickup conveying profile each correspond to the boundary of the respective rotor in its rotation plane, more specifically on the side which faces forwards in its direction of rotation. This is, therefore, the profile which primarily acts on the crop material. The pickup conveying profile is inclined more steeply forwards than the transfer conveying profile, which is always inclined rearwards. This means that the pickup conveying profile either has a shallower rearward slope than the transfer conveying profile, a forward slope, or no slope, i.e., the pickup conveying profile can also extend radially. This embodiment exploits the fact that the conveying profile of the two rotors can be adapted independently with regard to their respective task. For picking up the crop material from the ground, a shallow rearward slope or even a forward slope is optimal. For stripping off the crop material, on the other hand, a rather steep rearward slope, which facilitates the interaction with the stripping device, is advantageous. Here, the terms “forward slope” and “rearward slope” each denote an inclination relative to the radial direction or (when considered in three dimensions) the axial-radial plane.

It is advantageous if the transfer prongs are designed in such a way that, in the course of the movement of the transfer rotor along the stripping device, a stripping angle between a respective part of the transfer conveying profile, which is adjacent to the stripping device and the adjacent transfer-prong stripper section is at least 80° throughout. The stripping angle can, in each case, be determined by forming the tangents to the transfer conveying profile and the surface of the stripper in the rotation plane of the transfer rotor, namely where the transfer conveying profile and the surface intersect, based on the said rotation plane. This corresponds to the radially innermost region in which crop material is conveyed and/or stripped off between the transfer prongs and the stripper. Ideally, the crop material should always undergo a radially outward force component, and therefore the stripping angle should be over 90°. Depending on various parameters, in particular the characteristics and quantity of the crop material, a smaller stripping angle, at least in some region or regions, may also be sufficient, however. If this is below 80°, however, it generally has the effect that crop material is not stripped off in an optimum manner but is trapped and squashed between the transfer prongs and the stripper. As a particular preference, provision can be made for the stripping angle to increase in the course of the movement of the transfer rotor, wherein it reaches its maximum value in an entry region, in which the transfer rotors enter fully between the transfer-prong stripper sections, or at least in the vicinity of the entry region.

It is likewise preferred that the transfer prongs have a transfer conveying profile which slopes rearwards, wherein an angle of inclination relative to a radial direction increases radially towards the outside. That is to say that the transfer conveying profile is inclined rearwards to an increasing extent towards the outside. The corresponding increase occurs at least in some region or regions, but is normally continuous. It would also be conceivable, however, for the rearward slope to be constant or to decrease in some region or regions. The increase in the rearward slope from the inside outwards can have a positive effect on the stripping behavior. It is thereby possible, in particular, also to ensure that the stripping angle remains sufficiently large when the transfer prongs gradually enter between the transfer-prong stripper sections. Normally, the angle between the radial direction of the transfer rotor and the surface of the stripper decreases towards the entry region. This can be compensated for by an increase in the rearward slope towards the outside.

It is also possible for the pickup prongs to have a pickup conveying profile, which is inclined forward to an increasing extent radially towards the outside. That is to say that, radially on the inside, for example, the pickup conveying profile can have a rearward slope which decreases towards the outside and/or makes a transition to a radial orientation or a forward slope. It would also be possible for it to have a continuous forward slope that increased radially towards the outside.

Embodiments in which the pickup-prong gaps and the transfer-prong gaps are separated from one another are conceivable. However, it is preferred that at least one pickup-prong gap merges into a transfer-prong gap in a transitional region. Thus, the two gaps form subregions of a continuous gap. The transitional region can be associated with the pickup-prong gap and/or the transfer-prong gap, with the association often not being clearly defined. As a rule, a pickup prong is retracted to the inner side of the stripping device in the transitional region, while a transfer prong emerges there to the outer side. A transfer of crop material between the rotors thus takes place in the transitional region or at least close to the latter. This transfer is promoted by the fact that the gaps merge into one another instead of being separated from one another.

In a transitional region, the stripping device advantageously has a guide edge, which delimits a pickup-prong gap and is inclined towards the axis of rotation in the direction of the transfer-prong gap, relative to a rotation plane perpendicular to the axis of rotation of the pickup rotor. In accordance with the rotary motion of the rotors, the edges of the gaps normally run predominantly parallel to the rotation plane of the respective rotor. A constant, advantageously small clearance between the stripping device and the prongs is thereby ensured overall. Where a gap ends or begins, it is possible, on the one hand, for the edge to run parallel to the axis of rotation. However, the transfer from the pickup rotor to the transfer rotor in the transitional region is easier if the guide edge runs neither parallel to the axis of rotation nor perpendicularly thereto but is inclined in the direction of the adjacent transfer-prong gap. Thus, crop material, which is located between the pickup prong, which is retracting, and the guide edge is guided sideways in the direction of the transfer-prong gap and thus, in the direction of the transfer rotor. The inclination relative to the rotation plane is advantageously between 20° and 70°, as a further preference between 30° and 60°. An inclination greater than 70° generally prejudices the laterally deflecting effect, with the result that crop material can build up at the edge. An inclination less than 20° generally leads to the guide edge having to be relatively long, resulting in a large subregion of the pickup-prong gap, which is not covered by the pickup prong. This would be as if it were an unwanted “dead zone”, through which crop material would either fall in an uncontrolled manner or which would gradually be clogged by crop material.

In particular, the field cultivating machine can be designed as a windrower, having at least one windrower unit, which has a pickup device and, as a downstream device, a transverse conveyor, which is configured to receive the crop material transferred by the transfer rotor on a conveying surface, to convey it along the transverse axis and to deposit it in windrows on the ground. Windrowers are used to deposit crop material which is lying flat or randomly on the ground in windrows. Machines of this kind are also referred to as mergers or as hay making machines, and their use is explicitly not restricted to hay. Normally, the windrower does not have its own travel drive and is provided so as to be towed by a tractor or to be carried as an attachment by a tractor. However, an embodiment with its own travel drive is conceivable.

The windrower can have a main frame, which can be supported by means of an undercarriage in the operating state. This main frame may form as it were the central element of the windrower and may be substantially responsible for its structural stability. It is normally of intrinsically rigid design but can be made up of a plurality of interconnected components. In the operating state, the main frame can be supported by means of an undercarriage. The main frame can have the undercarriage, which is thus part of the windrower. If the windrower is designed as an attachment, it is coupled in the operating state to an agricultural machine that has the undercarriage. In either case, at least some of the weight of the windrower can be absorbed and supported on the ground via the main frame and the undercarriage. Moreover, the main frame can be designed for at least indirect connection to a tractor, and a drawbar used for this purpose can be regarded as part of the main frame. As an alternative, the main frame can have structures for connection to an agricultural machine, which allows use as an attachment.

The windrower has at least one windrower unit. This can be connected at least indirectly to the main frame. Typically, either precisely one windrower unit is provided, or two windrower units are provided. The respective windrower unit can be connected to a side arm which, for its part, is connected to the main frame or forms a part thereof. The windrower unit has those elements of the windrower which, in use as intended, come into direct contact with the crop material and transport the latter.

The respective windrower unit has an above-described pickup device and, as a downstream device, a transverse conveyor having a transverse conveyor frame. As explained above, the transverse conveyor is arranged at least in part behind the pickup device in relation to the longitudinal axis. The transfer rotor transfers the crop material to the transverse conveyor. As already mentioned, this can also include throwing or dropping. The transverse conveyor is configured to receive the transferred crop material on a conveying surface, to convey it along the transverse axis, and to deposit it in windrows on the ground. For this purpose, the transverse conveyor has a conveying element, as a general rule, an endlessly revolving conveying element, e.g., a conveyor belt or link belt, and the term "belt-type windrower" may also be used. This conveying element can form or have the conveying surface on which the crop material is received. In the case of a revolving conveying element, the conveying surface moves sideways in relation to the transverse axis and takes the crop material along as it does so. The transverse conveyor normally conveys the crop material parallel to the transverse axis, but it could also convey it at a certain angle to the transverse axis. The transverse conveyor can have a transverse conveyor frame, on which the conveying element is movably mounted. Overall, the transverse conveyor frame imparts mechanical stability to the transverse conveyor and is normally of intrinsically rigid design. The pickup device can be connected to the transverse conveyor. In particular, it can be connected to the main frame via the transverse conveyor frame. The transverse conveyor and/or the pickup device are normally movable relative to the main frame, in particular, are at least vertically movable in relation to the vertical axis. In addition to the vertical mobility, there may also be mobility along the longitudinal axis and/or the transverse axis. Apart from translational movements of the transverse conveyor frame, rotational movement is also conceivable, e.g., transverse oscillation (corresponding to a rotation about the longitudinal axis).

The prior art includes pickup devices which push the crop material as it were onto a transverse conveyor. Such a configuration, in which the transfer of the crop material takes place as it were in one plane, is not excluded in the context of the present invention but can lead to problems. Thus, depending on its characteristics, the crop material may clump together as it is pushed along, and it may then be possible to convey it to the side only with difficulty. The crop may also be damaged as a result. There is therefore a preference for the transfer rotor to be configured to discharge at least some of the crop material above the conveying surface in relation to the vertical axis and to throw it onto said surface. Such an embodiment can be implemented, in particular, with a pickup rotor which transfers the crop material to a transfer rotor arranged at a higher level. In all cases, the transfer rotor in this embodiment extends at a higher level than the conveying surface or at least a part thereof. Depending on the embodiment, it may not be possible to determine exactly at what point and thus at what height the crop material is discharged from the transfer rotor. Normally, however, it is possible to identify a typical discharge region. Particularly in the case of a sufficiently high rotational speed, the crop material can be thrown off approximately tangentially from the transfer prongs. It then falls in a normally arc-shaped trajectory onto the conveying surface. If it is not possible to fling or throw off the crop material, it can also be removed from the transfer prongs by the transfer-prong stripper sections, after which it can fall approximately vertically onto the conveying surface. If the lowest region of the conveying surface is considered, then a point of the range of movement of the transfer prongs, which is uppermost in relation to the vertical axis can be arranged at a level which is, for example, at least 70% or at least 50% of a diameter of the range of movement higher along the vertical axis than the stated lowest range.

It is advantageous if an entry region, in which the transfer prongs enter fully between the transfer-prong stripper sections, is arranged above a region of the conveying surface adjacent to the pickup device. The entry region is therefore the region in which the entry of the transfer prongs is complete. Any crop material still adhering to the transfer prongs is stripped from the transfer prongs at the latest in the entry region, which can also be referred to as the retraction region. This normally corresponds to the lowest point from which crop material can fall. This region is still above that region of the conveying surface, which is adjacent to the pickup device. The said region can be arranged approximately vertically below the entry region. For the crop material, this results in a stage of falling from the entry region to the conveying surface. The height thereof can be, for example, at least 10% or at least 15% of the diameter of the range of movement of a transfer prong. In absolute numbers, it is preferably at least 5 cm, at least 7 cm, or at least 10 cm.

One embodiment envisages that the transverse conveyor can at least be arranged in such a way that the conveying surface is tilted relative to the horizontal plane towards the pickup device. That is to say that the conveying surface is either permanently tilted in an appropriate manner or various arrangements of the transverse conveyor are possible, wherein the conveying surface is tilted towards the pickup device in at least one of the said arrangements. The conveying surface does not run horizontally but is tilted towards the pickup device, that is to say, in general, forwards in the direction of travel. The angle of inclination relative to the horizontal plane can be, in particular, between 5° and 35°, preferably between 10° and 30°, as a further preference between 15° and 25°. The oblique positioning of the conveying surface prevents the crop material that is flung off by the transfer rotor at a considerable speed from moving too far rearwards. Better and more uniform distribution of the crop material on the conveying surface can thus be achieved. In the case of an inclination which is significantly greater than 35°, there is the risk that the crop material will slide or roll downwards on the conveying surface and collect in a forward region of the conveying surface. Irrespective of whether the conveying surface is tilted as described here, a retention device, in particular a baffle, can be arranged on an opposite side of the conveying surface from the pickup device. This can have a significantly greater tilt forwards in the direction of travel relative to the horizontal plane (e.g., over 70°) and can even have overhanging regions which project upwards in the direction of travel.

As already explained above, the embodiment according to the invention with two rotors contributes to preventing an excessively deep pile of crop material collecting in front of the pickup rotor. This effect can be further enhanced. According to a corresponding embodiment, the field cultivating machine has a hold-down device with a rotatable hold-down roller, which is arranged at least in part in front of the pickup rotor in relation to the longitudinal axis, and a guide cover, which is arranged at least in part behind it in relation to the longitudinal axis and defines a conveying duct for crop material between itself and at least one of the rotors. The hold-down roller, which can have a smooth or profiled surface, is rotatable about an axis of rotation which normally runs parallel to the transverse axis. It exerts, in particular, a vertical pressure on the crop material in front of the pickup rotor and thus limits the piling up of the crop material. At the same time, depending on the embodiment, it can also act as a counter-holder for crop material which has already been picked up by the pickup rotor. The hold-down device furthermore has a guide cover, which is arranged at least in part behind the hold-down roller in relation to the longitudinal axis. It can adjoin the hold-down roller with a certain clearance. In particular, the guide cover can have at least one guide plate or can be designed as such. It is preferably impenetrable for crop material and has a closed surface. However, it would also be possible to conceive of embodiments in which, for example, it had a plurality of spaced guide elements, which could, in particular, be of arcuate design. The guide cover could also be referred to as a guide hood. Optionally, as a supplement to the hold-down roller, it forms a counter-holder for the crop and limits the freedom of movement thereof. A conveying duct for the crop material is thus defined between the guide cover and at least one of the rotors. By means of this duct, it is possible essentially to prevent loss of crop material, and/or to convey the crop material more effectively by the corresponding rotor.

The hold-down device is preferably suspended in such a way by means of at least one hold-down device carrier that it is at least vertically movable relative to the rotors. For its part, the hold-down device carrier can be connected directly or indirectly to the vehicle body or to a main frame of the field cultivating machine. According to one embodiment, the hold-down device carrier is connected movably to a transverse conveyor frame of the transverse conveyor. In particular, it can be connected pivotably thereto. In each case, the hold-down device carrier provides suspension of the hold-down device, which allows at least vertical movement relative to the rotors. A movement in the horizontal direction can be superimposed on the vertical movement. Here, a spring element, e.g., a hydraulic cylinder, can be used to define a rest position of the hold-down device carrier, from which it can be deflected, e.g., when the hold-down roller has to yield upwards on account of a relatively large quantity of crop material in front of the pickup rotor. The same applies to any possible yielding of the guide cover that may be necessary.

Even though a corresponding vertical mobility of the hold-down device as a whole is advantageous, provision can be made in addition to this, or possibly as an alternative, for the hold-down roller and/or the guide cover to be individually adjustable relative to the hold-down device carrier. Both in relation to the hold-down roller and to the guide cover, vertical adjustment and/or horizontal adjustment may be possible. With regard to the hold-down roller, said roller can be arranged on a roller carrier, which can be adjustable in translation and/or pivotable relative to the hold-down device carrier. Manual adjustability is possible, wherein the respectively selected position can be secured by tightening a locking screw. However, actuator adjustment would also be conceivable.

According to one embodiment, the field cultivating machine has a plurality of guide prongs, which extend along the longitudinal axis and are configured to guide the crop material discharged by the transfer rotor in the direction of the downstream device, wherein an inclination of the guide prongs relative to the longitudinal axis is adjustable in the direction of the transverse axis. As a general rule, the guide prongs are spaced apart from one another in relation to the transverse axis, i.e., gaps are formed between them. The guide prongs can be made of metal but may also be made of other materials, such as plastic or composites. They can be formed by wire or rods. As an alternative, they could also be formed by sheet metal or comparable sheet-like material. The guide prongs extend along the longitudinal axis but in general do not run parallel to the latter. However, there is preferably at least one position provided in which the guide prongs run parallel to the longitudinal plane, i.e., to the plane which is defined by the longitudinal axis and the vertical axis. The guide prongs are preferably arranged at least in part above the transfer rotor. By means of the guide prongs, the crop material which is discharged by the transfer rotor can be guided in the direction of the downstream device. This is advantageous, particularly in the case of a transverse conveyor. By their orientation, the guide prongs define a direction of movement which the crop material can follow with minimal resistance. In general, the crop material does not move exactly parallel to the direction of the extent of the guide prongs, but they nevertheless exert a directing or guiding effect on the crop material. In the embodiment under consideration, this is exploited inasmuch as the inclination of the guide prongs towards the transverse axis is adjustable. That is to say that the guide prongs can be tilted to the side by different amounts (or even not at all). As a result, the crop material, which is driven substantially in the direction of the longitudinal axis and in the direction of the vertical axis by the transfer rotor, is subject to lateral deflection. It may be stated that a velocity component in the direction of the transverse axis is imposed on the crop material.

In this context, it is regarded as an independent invention to make available a field cultivating machine in accordance with the pre-characterizing clause of Claim 1, which has a plurality of guide prongs, which extend along the longitudinal axis and are configured to guide the crop material discharged by the transfer rotor in the direction of the downstream device, wherein an inclination of the guide prongs relative to the longitudinal axis is adjustable in the direction of the transverse axis.

One embodiment envisages that the hold-down device has a plurality of guide prongs, which extend along the longitudinal axis and are configured to guide the crop material discharged by the transfer rotor in the direction of the downstream device. This embodiment can optionally be combined with the abovementioned embodiment in which the inclination with respect to the transverse axis is adjustable. The guide prongs can adjoin the guide cover. By way of example, they can be connected movably, in particular pivotably, to the guide cover. In this case, the guide prongs extend rearwards in relation to the longitudinal axis, i.e., counter to the direction of travel. The guide prongs can partially define a gap between them and one of the rotors, in particular, the transfer rotor. This gap can adjoin the abovementioned conveying duct or can also be regarded as part thereof. In contrast to the guide cover, the guide prongs are generally spaced apart in such a way that crop material could get between them. However, this is normally not very problematic in the region in which the guide prongs are arranged. In particular, there is, in general, only a small risk that crop material will be completely lost, i.e., will fall back onto the ground, in this region. Normally, even the crop material which passes between the guide prongs still gets to the downstream device, in particular to the transverse conveyor. However, it would also be conceivable additionally to provide a cover above the guide prongs, and this cover can also be designed as part of the guide cover. In this way, it would be possible to prevent the loss of crop material almost completely.

Further adjustment possibilities for the guide prongs are also conceivable. One embodiment envisages that an inclination of the guide prongs relative to the longitudinal axis can be adjusted in the direction of the vertical axis. It may also be stated that, in this case, an inclination relative to the horizontal plane can be adjusted. It is thereby possible, in particular, to change a throwing distance of the transfer rotor. If, when viewed from the front to the rear—the guide prongs are tilted downwards to a greater extent, the crop material is guided downwards more quickly and/or more sharply, this being synonymous with a shorter throwing distance. If the guide prongs are tilted upwards to a greater extent, a longer throwing distance is the result. It will be implicitly understood that the throwing distance depends on additional parameters, in particular, the speed of rotation of the transfer rotor and the characteristics of the crop material. Individual adjustability of single guide prongs is possible. However, it is also advantageously possible for all the guide prongs to be arranged on a prong carrier which is pivotable together with the guide prongs. The inclination can be manually adjustable since it can normally be kept constant for the cultivation of a field. As an option, however, it could also be adjustable by an actuator.

The invention furthermore makes available a pickup device for a field cultivating machine, having a pickup rotor and a transfer rotor, which can be driven in the same direction about axes of rotation which extend at least predominantly along a transverse axis, wherein the pickup rotor is configured to pick up agricultural crop material from the ground by means of pickup prongs, to lift it in relation to a vertical axis and to transfer it to the transfer rotor, which is configured to take over the crop material by means of transfer prongs and to transfer it to a downstream device, which is arranged at least in part behind the pickup device in relation to a longitudinal axis, wherein the transfer prongs engage between the pickup prongs in such a way that ranges of movement of the transfer prongs and the pickup prongs overlap when viewed along the transverse axis, wherein the pickup device has a stripping device with pickup-prong stripper sections and pickup-prong gaps, which are formed therebetween in relation to the transverse axis and through which the pickup prongs at least partially project.

According to the invention, the stripping device has transfer-prong stripper sections and transfer-prong gaps formed therebetween, through which the transfer prongs at least partially project, wherein the transfer-prong stripper sections are designed in such a way that, as the transfer rotor rotates, the transfer prongs enter between them.

The terms mentioned have already been explained above with reference to the field cultivating machine according to the invention. Advantageous embodiments of the pickup device according to the invention correspond to those of the field cultivating machine according to the invention.

It is expressly pointed out that the above-described embodiments of the invention can be combined in each case individually, but also in any combinations with one another, with the subject matter of the main claim, provided that no technically compelling obstacles are in conflict therewith.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

Further modifications and embodiments of the invention can be derived from the following description of the subject matter and the drawings.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated. Further details and advantages of the invention can be found in the schematic figures described below.

The invention is described below with reference to figures. The figures are purely illustrative and do not limit the general concept of the invention. More specifically.

An artisan of ordinary skill in the art need not view, within isolated figure(s), the near infinite number of distinct permutations of features described in the following detailed description to facilitate an understanding of the present invention.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated. The hereinafter elucidated features may also be an aspect of the invention individually or in combinations other than those shown or described, but always at least in combination with the features of the claims. Where appropriate, functionally equivalent parts are provided with identical reference numbers.

Figure 1:
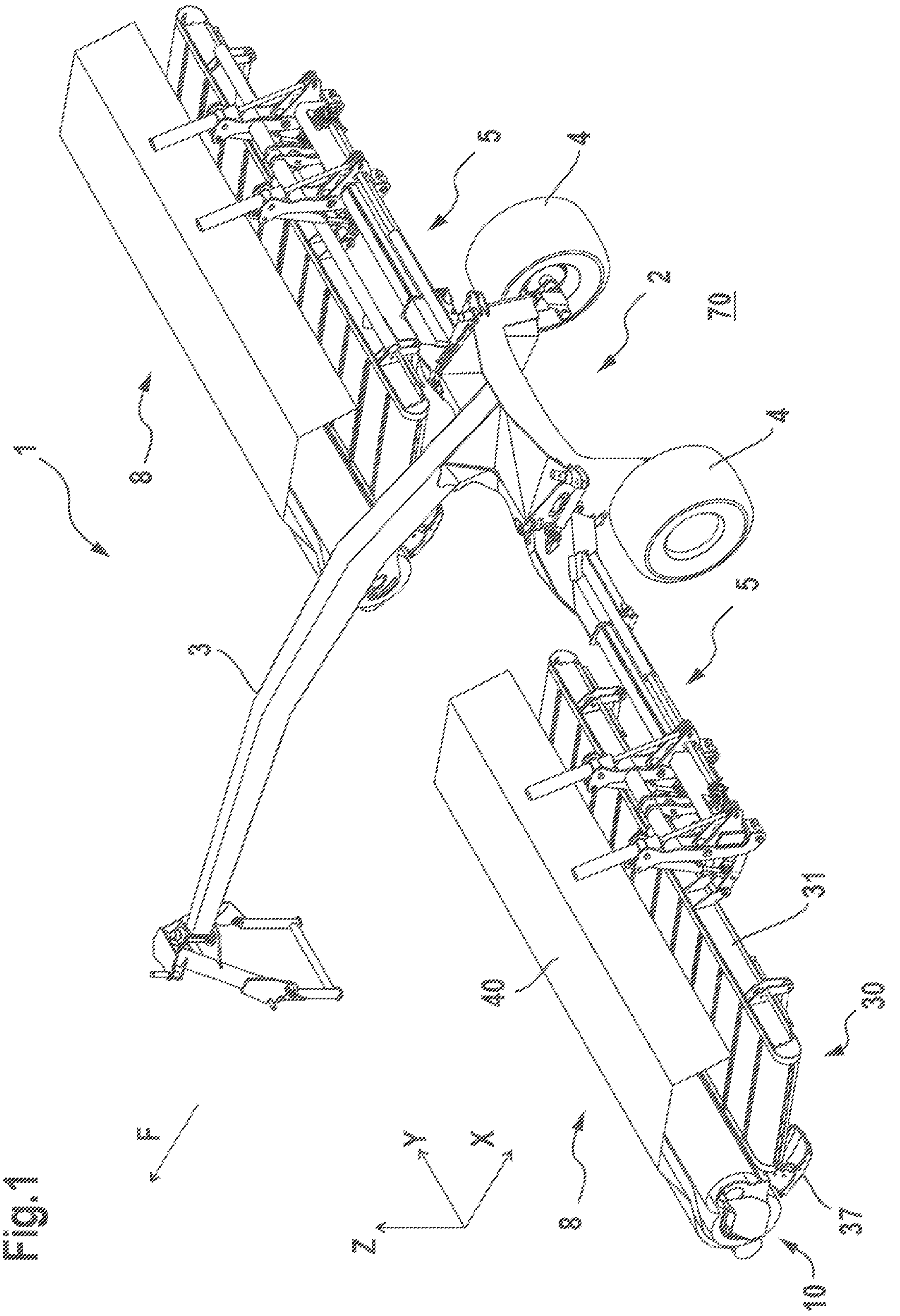
FIG. 1 shows a perspective view of a field cultivating machine according to the invention designed as a windrower.

FIG. 1 shows a field cultivating machine according to the invention, in this case, a windrower 1, which is provided for towing by a tractor (not illustrated here). The windrower 1 has a main frame 2, which can be supported on the ground 70 via two wheels of an undercarriage 4. In addition, the main frame 2 has a drawbar 3, which points forwards in a direction of travel F, which extends along a longitudinal axis X, and via which it is coupled to the tractor. Two side arms 5, on each of which a windrower unit 8 is arranged, extend parallel to a transverse axis Y on both sides of the main frame 2. The two windrower units 8 and their connection to the main frame 2 are identical or mirror-symmetrical, for which reason only one windrower unit 8 is considered below in each case.

The windrower unit 8 has a pickup device 10 and a transverse conveyor 30, which is arranged behind the latter in relation to the longitudinal axis X. When the windrower 1 is towed in the direction of travel F, the pickup device 10 picks up crop material from the ground 70 and transfers it to the transverse conveyor 30. The transverse conveyor 30 has a transverse conveyor frame 31 and a conveyor belt 32, which can be driven in revolution on the said frame. By means of this conveyor belt 32, the crop material is received on a conveying surface 33, conveyed sideways in relation to the transverse axis Y, and deposited in windrows on the ground 70. FIG. 1 shows a configuration of the windrower 1, which is provided for deposition of the crop material on the inside, i.e., towards the central plain of the windrower 1. In this case, the two windrower units 8 are clearly spaced apart along the transverse axis Y, and the conveyor belts 32 are driven in such a way that they each convey the crop material towards the center. In an alternative working configuration (not illustrated here), the windrower units 8 can be adjusted towards the center on the side arms 5, such that they are arranged directly adjacent to one another. The windrower unit 8 is suspended in such a way that it can be moved relative to the main frame 2 in a manner not explained specifically here. In particular, it is vertically movable and can sense and follow the profile of the ground 70 by means of ground guidance elements 37.

The pickup device 10 has a pickup rotor 11, which can be driven in rotation about a first axis of rotation A and is guided along close to the ground 70, and a transfer rotor 14, which can be driven in rotation in the same direction as the pickup rotor 11 about a second axis of rotation B and is offset rearwards in relation to the longitudinal axis X and upwards in relation to a vertical axis Z relative to the pickup rotor 11. In the figures, the axes of rotation A, B extend parallel to the transverse axis Y, corresponding to alignment on level, horizontal ground 70. Owing to the mentioned mobility of the windrower unit 8, the alignment of the axes of rotation A, B may temporarily deviate from the transverse axis Y but normally by at most 20°. It is also possible that not only the windrower unit 8 as a whole is movable but that the pickup device 10 is split along the transverse axis Y into two subunits which can tilt relative to one another in order to adapt to irregularities in the ground. In this case, each of the axes of rotation in the two subunits can extend differently, although deviations of less than 20° are likewise typical.

Figure 4:
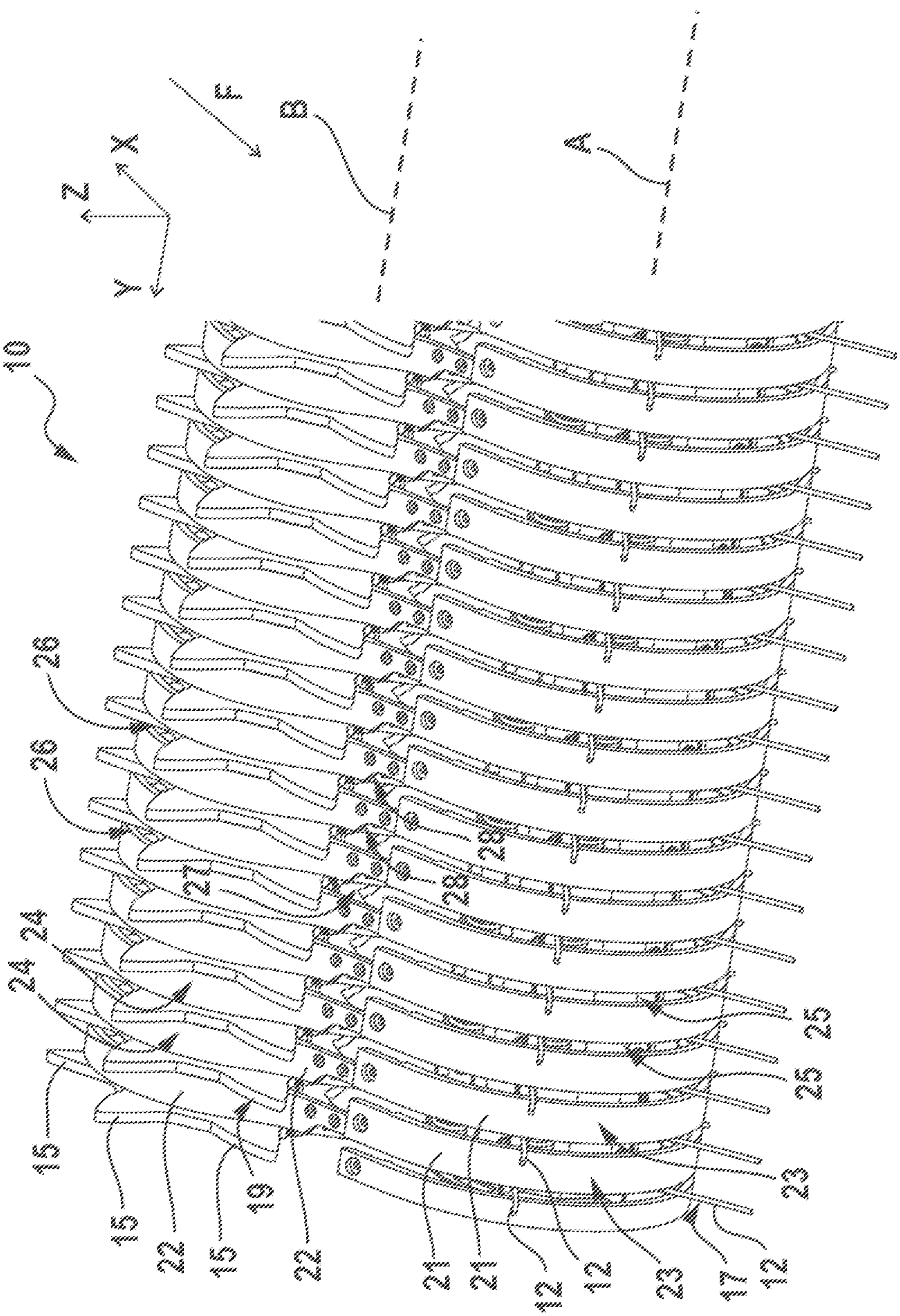
FIG. 4 shows a perspective view of a pickup device of the windrower unit from FIG. 2.
Figure 5:
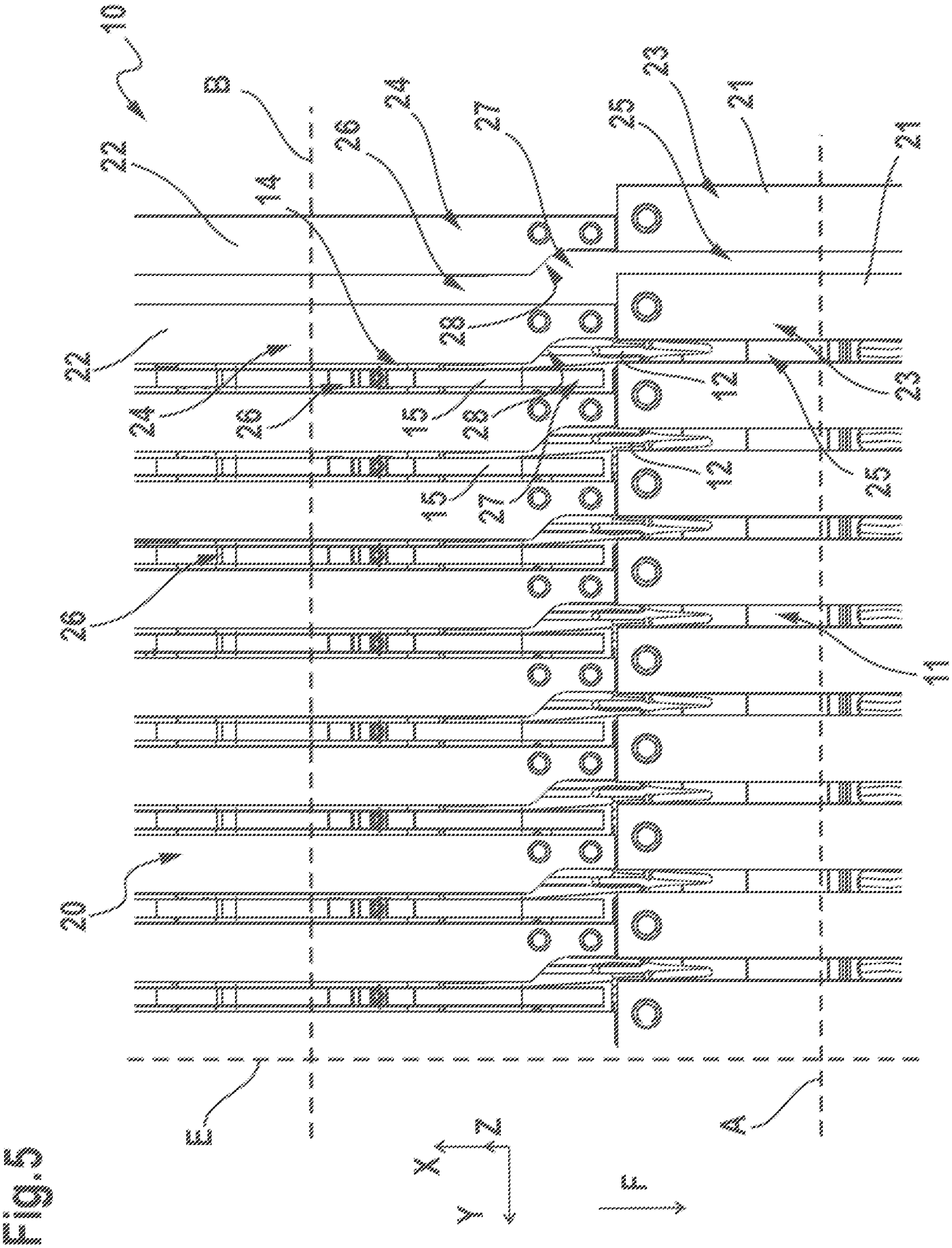
FIG. 5 shows another view of the pickup device from FIG. 4.

The function of the pickup device 10 is to pick up crop material from the ground 70 and to transfer it to the transverse conveyor 30. To be more precise, the pickup rotor 11 picks up the crop material and transfers it to the transfer rotor 14, which, for its part, transfers it to the transverse conveyor 30. The pickup rotor 11 has a plurality of pickup prongs 12, which in the present case are formed from spring wire. They are arranged on a rotor core 13, which is visible in FIG. 2. As can be seen, for example, in FIGS. 4 and 5, the pickup prongs 12 are grouped in a plurality of prong rings, which are spaced apart along the transverse axis Y. The transfer rotor 14 has a plurality of transfer prongs 15, which can be formed by segments made of sheet metal or else of plastic. These too are grouped into prong rings and arranged on a rotor core 16. In FIG. 1, instead of the respective prongs 12, 15, only the cylindrical enveloping surfaces of their ranges of movement C, D are illustrated for the sake of clarity. As is apparent from FIG. 3, a first range of movement C of each pickup prong 12 overlaps with a second range of movement D of a transfer prong 15 in the direction of the transverse axis Y (which is perpendicular to the plane of the drawing in FIG. 3). This is made possible by the fact that the transfer prongs 15 are arranged offset relative to the pickup prongs 12 in the direction of the transverse axis Y and can thus engage in gaps between the respective pickup prongs 12. This state of affairs is apparent, especially in FIGS. 4 and 5.

The pickup device 10 furthermore has a stripping device 20, which is formed from metallic stripping elements 21, 22. The stripping device 20 defines pickup-prong stripper sections 23 arranged between the pickup prongs 12 along the transverse axis Y and defines transfer-prong stripper sections 24 arranged between the transfer prongs 15 along the transverse axis Y. In this embodiment, the respective pickup-prong stripper section 23 is formed substantially by a first stripping element 21, while the respective transfer-prong stripper section 24 is formed substantially by a second stripping element 22, which in each case adjoins a first stripping element 21 almost seamlessly. However, some other embodiment would also be possible. The pickup prongs 12 each move through pickup-prong gaps 25, which are formed between two pickup-prong stripper sections 23. The transfer prongs 15 each move through transfer-prong gaps 26, which are each formed between two transfer-prong stripper sections 24. The pickup-prong gaps 25 are offset from the transfer-prong gaps 26 in relation to the transverse axis Y. This corresponds to the arrangement of the pickup prongs 12, which are likewise arranged offset from the transfer prongs 15 in relation to the transverse axis Y. Each pickup-prong gap 25 merges into a transfer-prong gap 26 in a transitional region 27. In the course of their rotary motion, the pickup prongs 12 retract to an inner side of the stripping device 20 in the transitional region 27, while the transfer prongs move towards the outer side from the inner side of the stripping device 20 in the transitional region 27. In the transitional region 27, the stripping device 20 has a guide edge 28, which delimits the pickup-prong gap 25. This guide edge 28 is inclined, relative to a rotation plane E perpendicular to the first axis of rotation A of the pickup rotor 11, towards the axis of rotation A in the direction of the adjacent transfer-prong gap 26. Thus, crop material, which is located between the pickup prong 12, which is retracting to the inner side, and the guide edge 28 is guided sideways in the direction of the transfer-prong gap 26 and thus in the direction of the transfer rotor 14. In this example, the inclination relative to the rotation plane E is about 45°, but other angles of inclination would also be possible, e.g. between 30° and 60°. The crop material is taken up and conveyed onwards by the transfer prongs 15. In an entry region 29, which is arranged to the rear of the stripping device 20 in relation to the longitudinal axis X, the transfer prongs 15 are retracted again fully between the transfer-prong stripper sections 24.

Figure 6:
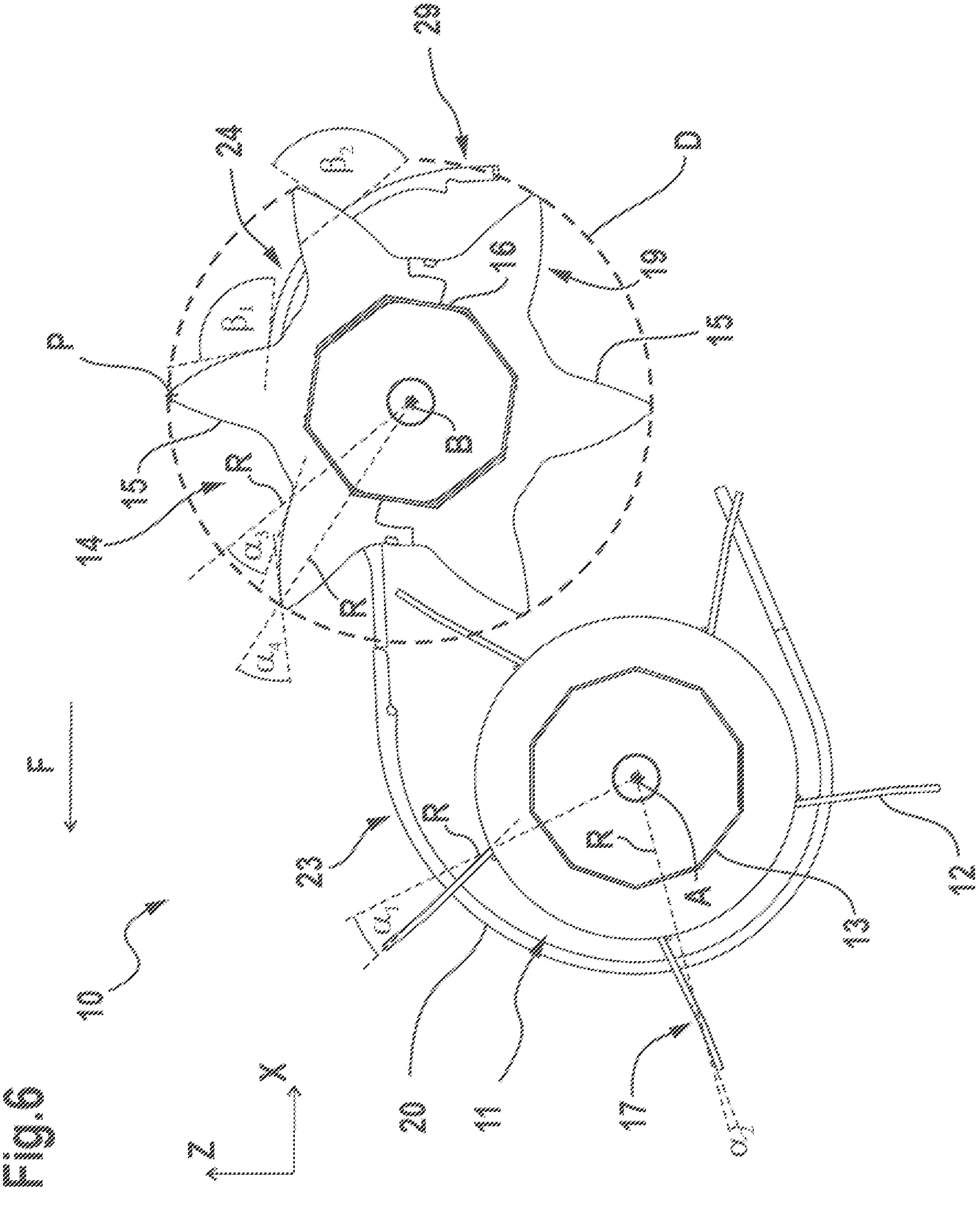
FIG. 6 shows a sectional illustration of part of the pickup device from FIG. 4.
Figure 7:
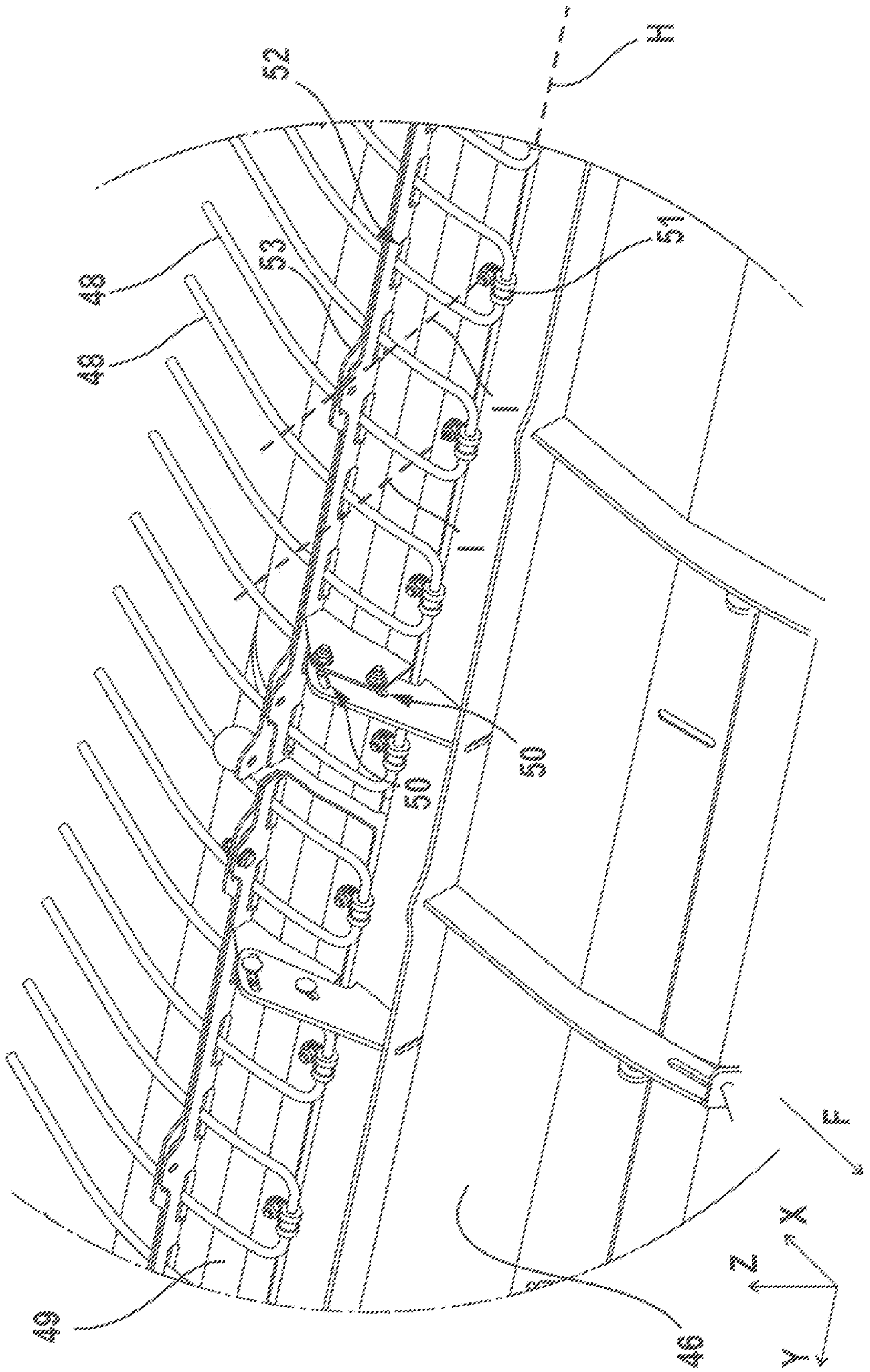
FIG. 7 shows a perspective illustration of part of a hold-down device of the windrower unit from FIG. 2.

As can be seen especially in FIG. 6, the transfer prongs 15 have a transfer conveying profile 19, which is arranged at the front in the direction of rotation and slopes rearwards, with the result that it recedes tangentially in a radially outward direction. Here, the corresponding angle of inclination $a_3$, $a_4$ relative to a radial direction R is between 33° and 40°. The pickup prongs 12 have a pickup conveying profile 17, which is arranged at the front in the direction of rotation and likewise slopes rearwards, but at a shallower angle throughout than the transfer conveying profile 19. In this example, the angle of inclination $a_3$, $a_4$ relative to the radial direction R is between 6° and 16°. The relatively shallow rearward slope of the pickup conveying profile 17 is optimized for picking up the crop material from the ground 70. To further enhance this, the angle of inclination $a_3$, $a_4$ also decreases from the inside outwards, such that on the inside, it corresponds to a first angle of inclination $a_3$ of 16° and on the outside corresponds to a second angle of inclination $a_4$ of 6°. For stripping off the crop material, on the other hand, the comparatively steep rearward slope of the transfer conveying profile 19 is advantageous since it facilitates the interaction with the stripping device 20. The angle of inclination $a_3$, $a_4$ decreases radially from the inside outwards from a third angle of inclination $a_3$ of 33° to a fourth angle of inclination $a_4$ of 40°. By virtue of this rearward slope, a stripping angle $b_1$, $b_2$ between the transfer conveying profile and the stripping device 20 is always over 100° in this example. The stripping angle $b_1$, $b_2$ changes in the course of the rotation of the transfer rotor 14 and is, in each case, measured between a part of the transfer conveying profile 19, which is adjacent to the stripping device 20, and the adjacent transfer-prong stripper section 24. In the case of the uppermost transfer prong 15 in FIG. 6, a first stripping angle $b_1$ is 106°. In the case of the next transfer prong 15 in the direction of rotation, a stripping angle $b_2$ is 108°, that is to say, the stripping angle increases until, finally, it reaches its maximum value in the entry region 29 (in this example 1180). This increase in the stripping angle $b_1$, $b_2$ is substantially promoted by the above-described increase in the angle of inclination $a_3$, $a_4$. The fact that the stripping angle is constantly significantly above 900 ensures that the crop material is always subject to a radially outward-directed force component, such that it cannot be trapped and squashed between the transfer prongs 15 and the stripping device 20. The increase in the stripping angle $b_1$, $b_2$ increasingly intensifies the stripping effect towards the entry region 29.

Since the transfer rotor 14 is arranged at least in part higher than the pickup rotor 11, the crop material is lifted in a total of two stages in relation to the vertical axis Z. The crop material lying in a certain depth on the ground 70 is first of all taken up by the pickup prongs 12 and conveyed by these upwards and proportionally rearwards along the longitudinal axis X. Some of it is stripped off by the stripping device 20, but some of it is also taken over directly by the transfer prongs 15 of the transfer rotor 14. In all cases, the crop material is ultimately taken over by the transfer rotor 14, which in turn lifts the crop material in relation to the vertical axis Z and conveys it rearwards in relation to the longitudinal axis X. Overall, the crop material can be brought to a relatively great height above the ground 70, while the pickup rotor 11 can be kept comparatively small, wherein the range of movement C of a pickup prong 12 has a diameter of 60 cm, for example. This, in turn, has the effect that the pickup prongs 12 take up the crop material in a phase of movement in which they are already moving predominantly upwards and not primarily forwards in the direction of travel F. This therefore very largely prevents the pickup rotor 11 from flinging the crop material forwards or merely pushing it ahead of itself. The great conveying height achieved overall in this way is in turn, advantageous for the transfer of the crop material to the transverse conveyor 30, as explained below. The conveying height is also achieved by virtue of the fact that the transfer rotor is arranged at least in part above the conveying surface. In particular, a point P of the range of movement D of the transfer prongs 15, which is uppermost in relation to the vertical axis Z can be arranged about 70% of the diameter of the range of movement D higher along the vertical axis Z than a lowermost region 34 of the conveying surface 33 adjacent to the pickup device 10.

Figure 2:
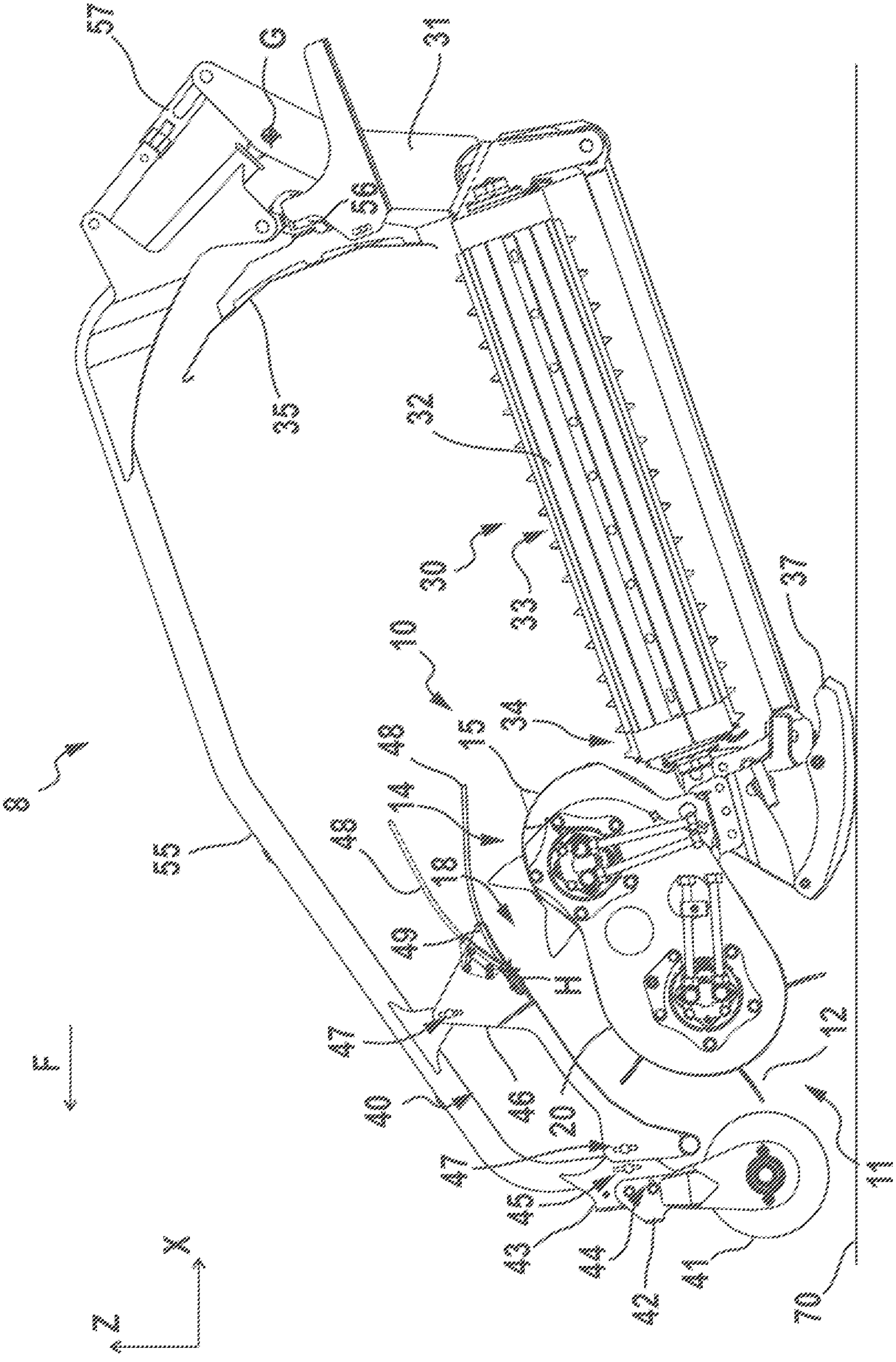
FIG. 2 shows a side view of a windrower unit of the windrower from FIG. 1.
Figure 3:
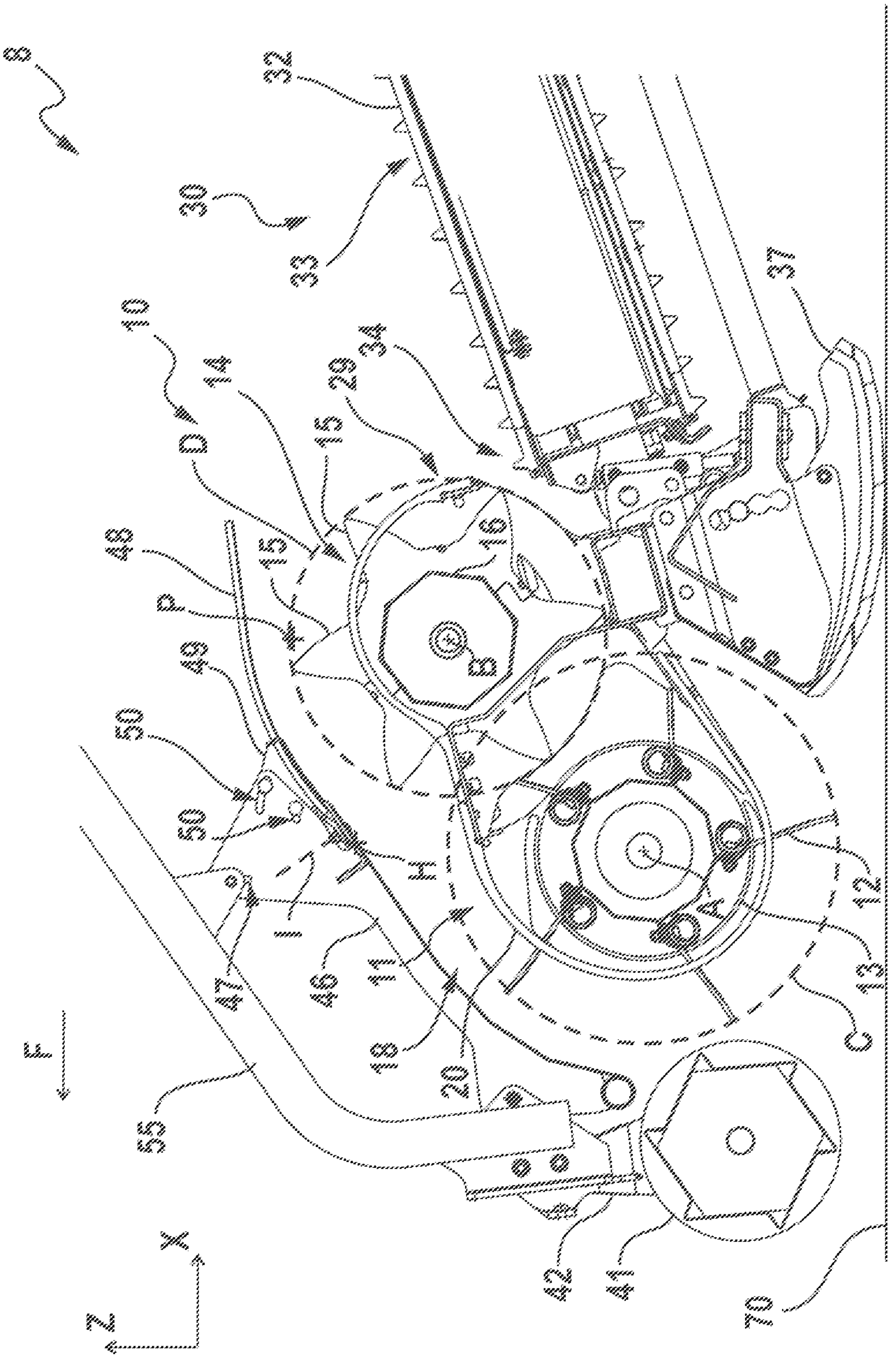
FIG. 3 shows a sectional illustration from the side of part of the windrower unit from FIG. 2.

Both the rotational speed of the pickup rotor 11 and that of the transfer rotor 14 can be adjusted, more specifically independently of one another. In particular, the rotational speed of the pickup rotor 11 can be adjusted as a function of the speed of travel of the windrower 1 and of the quantity and possibly the characteristics of the crop material on the ground 70. The rotational speed of the pickup rotor 11 normally results in a sensible minimum rotational speed of the transfer rotor 14, which is necessary to transport the accepted crop material onwards with sufficient speed. In addition, the rotational speed of the transfer rotor 14 can be selected in accordance with further factors. In particular, it is advantageously selected so that some of the crop material can detach itself from the transfer rotor 14 by virtue of the centrifugal force and is thus not simply stripped off but is thrown or flung. As a result, the crop material does not simply fall down where it would land on a region 34 of the conveying surface 33, which is adjacent to the pickup device 10. On the contrary, the crop material is also, and, in particular, preferentially, thrown predominantly towards the center of the conveying surface and also in part towards the opposite end from the pickup device 10. Thus, uniform distribution of the crop material on the conveying surface 33 is achieved, and possible accumulation leading to damage to the crop material can be prevented. To prevent the crop material from getting too far back in relation to the longitudinal axis X, the conveying surface 33 is, on the one hand, tilted forwards in the direction of the pickup device 10 in relation to a horizontal plane. In FIGS. 2 and 3, the angle of inclination is about 20°, but other angles of inclination are also possible and expedient. As an additional measure, the windrow unit 8 has a baffle 35 at the rear of the transverse conveyor 30. It should be noted that, even the entry region 29, in which at the latest any crop material still adhering to the transfer prongs 15 is stripped off, is arranged clearly above the region 34 of the conveying surface 36 adjacent to the pickup device 10. That is to say that even this crop material is thrown off and not simply pushed or pressed onto the conveying surface 33, which would, in turn, increase the risk of damage.

In order to promote efficient pickup and conveying of the crop material, the windrower unit 8 furthermore has a hold-down device 40. This is connected to the transverse conveyor frame 31 by means of a hold-down device carrier 55. In FIG. 1, the hold-down device 40 and the hold-down device carrier 55 are illustrated only schematically, while their precise structure is apparent from FIGS. 2, 3, and 6. The hold-down device 40 has a hold-down roller 41, which is rotatably mounted on a roller carrier 42, which, for its part, is connected via an intermediate element 43 to the hold-down device carrier 55. In this case, a position of the carrier 42 on the hold-down device carrier 55 can be varied. On the one hand, a first adjustment guide 44 is provided for this purpose, the said guide being formed by a slotted hole in the roller carrier 42 and a screw passed through this hole and connected to the intermediate element 43. Loosening the screw enables the roller carrier 42 to be pivoted relative to the intermediate element 43, thereby essentially enabling a position of the hold-down roller 41 to be changed in the direction of the longitudinal axis X before the screw is tightened again. By means of a second adjustment guide 45, the intermediate element 43 can be adjusted in height together with the roller carrier 42 and the hold-down roller 41. On the one hand, the hold-down roller 41 ensures that the crop material cannot pile up too high in front of the pickup rotor 11, and, on the other hand, it forms a counter-holder for crop material that has already been taken up by the pickup rotor 11. Above the hold-down roller and behind it in relation to the longitudinal axis X there is an adjoining guide cover 46, which is designed as a guide plate. The guide cover 46 is impenetrable for crop material and defines a conveying duct 18 between itself and the rotors 11, 14. It prevents crop material from becoming detached prematurely from one of the rotors 11, 14. The guide cover 46 is also adjustably connected to the hold-down device carrier 55, for which purpose third adjustment guides 47 are provided. Finally, the hold-down device carrier 55 together with the hold-down device 40 is pivotable as a whole relative to the transverse conveyor frame 31 about a pivoting axis G. Its pivoting position can be influenced by means of a hydraulic cylinder 56. Adaptation to the current quantity or characteristics of the crop material, for example, is thereby possible. A freedom of movement of the hold-down device carrier 55 can be adjusted by means of a pivot limiter 57, which is arranged between the hold-down device carrier 55 and the transverse conveyor frame 31.

A plurality of guide prongs 48, which extend rearwards in relation to the longitudinal axis X, is connected to the guide cover 46. They can be formed by a wire, e.g. spring wire. They are arranged in their entirety on a prong carrier 49, which is pivotable relative to the guide cover about a pivoting axis H running parallel to the transverse axis Y. This is implemented in turn by means of fourth adjustment guides 50. By changing the inclination of the guide prongs 48 relative to the horizontal plane, the throwing distance of the crop material can be significantly influenced. In FIG. 2, a solid line is used to illustrate a minimum inclination, which, given otherwise identical parameters, produces the shortest throwing distance, and a dotted line is used to illustrate a maximum inclination, which leads to a maximum throwing distance. The respectively suitable setting depends on various parameters, in particular, the rotational speed of the transfer rotor 14 and the characteristics of the crop material. By virtue of their parallel, elongate structure, which is clearly apparent in FIG. 6, the guide prongs not only limit the trajectory of the crop material in relation to the vertical axis Z but also influence the movement of the crop material along the transverse axis Y. In FIG. 6, each guide prong is arranged parallel to a longitudinal plane defined by the longitudinal axis X and the vertical axis Y. However, its inclination in the direction of the transverse axis Y is variable. In the embodiment illustrated here, two adjacent guide prongs 48 are, in each case, connected integrally to one another and fastened to the prong carrier 49 by means of a hose clip 51. The hose clip 51 is pivotable about a pivoting axis I. Each guide prong 48 is guided, on the one hand, by a slotted hole 52 formed on the prong carrier 49 and extending parallel to the transverse axis Y and, on the other hand, by a hole (not visible in the figures) in an adjusting plate 53, which can be locked on the prong carrier 49 by means of screws. By shifting the adjusting plate 53 parallel to the transverse axis Y, it is possible to simultaneously adjust the inclination of a plurality of pairs of guide prongs 48. In this case, the inclination can be adapted to the currently selected conveying direction of the transverse conveyor 30. That is to say that, when the transverse conveyor 30 is currently conveying to the left when viewed in the direction of travel F, the inclination of the guide prongs 48 is adapted in such a way that their tips shift to the left. This ensures that a speed component in the intended direction is imparted to the crop material even before it reaches the conveying surface 33, assisting and accelerating removal by the transverse conveyor 30.

From the foregoing, it can be seen that the present invention accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 1

| List of Reference Characters | |
|---|---|
| 1 | Windrower |
| 2 | Main frame |
| 3 | Drawbar |
| 4 | Undercarriage |
| 5 | Side arms |
| 8 | Windrower unit(s) |
| 10 | Pickup device |
| 11 | Pickup rotor |
| 12 | Pickup prong(s) |
| 13 | Rotor core |
| 14 | Transfer rotor |
| 15 | Transfer prong(s) |
| 17 | Pickup conveying profile |
| 18 | Conveying duct |
| 19 | Transfer conveying profile |
| 20 | Stripping device |
| 21 | First stripping element |
| 22 | Second stripping element |
| 23 | Pickup-prong stripper sections |
| 24 | Transfer-prong stripper sections |
| 25 | Pickup-prong gap(s) |
| 26 | Transfer-prong gap(s) |
| 27 | Transitional region |
| 28 | Guide edge |
| 29 | Entry region |
| 30 | Transverse conveyor |
| 31 | Transverse conveyor frame |
| 32 | Conveyor belt(s) |
| 33 | Conveying surface |
| 34 | Region |
| 35 | Baffle |
| 37 | Ground guidance elements |
| 40 | Hold-down device |
| 41 | Hold-down roller |
| 42 | Roller carrier |
| 43 | Intermediate element |
| 44 | Adjustment guide |
| 45 | Second adjustment guide |
| 46 | Adjoining guide cover |
| 47 | Third adjustment guides |
| 48 | Guide prong(s) |
| 49 | Prong carrier |
| 50 | Fourth adjustment guides |

TABLE 1-continued

| List of Reference Characters | |
|---|---|
| 51 | Hose clip |
| 52 | Slotted hole |
| 53 | Adjusting plate |
| 55 | Hold-down device carrier |
| 56 | Hydraulic cylinder |
| 57 | Pivot limiter |
| 70 | Ground |
| A | First axis of rotation |
| B | Second axis of rotation |
| C | First range of movement |
| D | Second range of movement |
| E | Rotation plane |
| F | Direction of travel |
| G | Pivoting axis |
| H | Pivoting axis |
| I | Pivoting axis |
| R | Radial direction |
| X | Longitudinal direction |
| Y | Transverse axis |
| Z | Vertical axis |
| $a_3$, $a_4$. | Angle of inclination |
| $b_1$, $b_2$ | Stripping angle |

GLOSSARY

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein, refers to slight variations in numerical quantities with respect to any quantifiable variable. Inadvertent error can occur, for example, through the use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes a structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

The invention claimed is:

1. A field cultivating machine (1) comprising of:

at least one pickup device (10), which has a pickup rotor (11) and a transfer rotor (14), which can be driven in the same direction about axes of rotation (A, B) which extend at least predominantly along a transverse axis (Y), wherein the pickup rotor (11) is configured to pick up agricultural crop material from the ground (70) by means of pickup prongs (12), to lift the crop material in relation to a vertical axis (Z) and to transfer the crop material to the transfer rotor (14), which is configured to take over the crop material by means of transfer prongs (15) and to transfer the crop material to a downstream device (30), which is arranged at least in part behind the pickup device (10) in relation to a longitudinal axis (X), wherein the transfer prongs (15) engage between the pickup prongs (12) in such a way that ranges of movement (C, D) of the transfer prongs (15) and the pickup prongs (12) overlap when viewed along the transverse axis (Y), wherein the pickup device (10) has a stripping device (20) with pickup-prong stripper sections (23) and pickup-prong gaps (25), which are formed therebetween in relation to the transverse axis (Y) and through which the pickup prongs (12) at least partially project, wherein the stripping device (20) has transfer-prong stripper sections (24) and transfer-prong gaps (26) formed therebetween, through which the transfer prongs (15) at least partially project, wherein, as the transfer rotor (14) rotates, the transfer prongs (15) enter between the transfer-prong stripper sections (24); and wherein, in the course of the movement of the transfer rotor (14) along the stripping device (20), a stripping angle ($b_1$, $b_2$) between a respective part of the transfer conveying profile (19) which Is adjacent to the stripper and the adjacent transfer-prong stripper section (24) is at least 80° throughout the transfer prongs (15).

2. The field cultivating machine according to claim 1, wherein the transfer rotor (14) is arranged at least in part higher than the pickup rotor (11) and is configured to lift the crop material taken over from the pickup rotor (11) at least initially in relation to the vertical axis (Z).

3. The field cultivating machine according to claim 1, wherein the transfer prongs (15) have a transfer conveying profile (19) which is arranged at the front in the direction of rotation and slopes rearwards, such that the transfer conveying profile (19) recedes tangentially in a radially outward direction, and the pickup prongs (12) have a pickup conveying profile (17) which is arranged at the front in the direction of rotation and slopes forwards to a greater extent, at least in some region or regions, than the transfer conveying profile (19).

4. The field cultivating machine according to claim 1, wherein the transfer prongs (15) have a transfer conveying profile (19) which slopes rearwards, wherein an angle of inclination ($a_1$, $a_2$) relative to a radial direction (R) increases radially towards the outside.

5. The field cultivating machine according to claim 1, wherein the at least one pickup-prong gap (25) merges into a transfer-prong gap (26) in a transitional region (27).

6. The field cultivating machine according to claim 5, wherein the transitional region (27), the stripping device (20) has a guide edge (28), which delimits one of the at least one pickup-prong gap (25) and is inclined towards the axis of rotation (A) in the direction of the transfer-prong gap (26), relative to a rotation plane (E) perpendicular to the axis of rotation (A) of the pickup rotor (11), wherein the inclination relative to the rotation plane (E) is between 20° and 70°.

7. The field cultivating machine according to claim 1, wherein the machine is designed as a windrower (1), having at least one windrower unit (8), which has a pickup device (10) and, as a downstream device, a transverse conveyor (30), which is configured to receive the crop material transferred by the transfer rotor (14) on a conveying surface (33), to convey the crop material along the transverse axis (Y) and to deposit the crop material in windrows on the ground (70).

8. The field cultivating machine according to claim 7, wherein the transverse conveyor (30) can at least be arranged in such a way that the conveying surface (33) is tilted relative to the horizontal plane towards the pickup device (10).

9. The field cultivating machine according to claim 1, wherein the transfer rotor (14) is configured to discharge at least some of the crop material above the conveying surface (36) in relation to the vertical axis (Z) and to throw crop material onto the said surface.

10. The field cultivating machine according to claim 1, further comprising an entry region (29), in which the transfer prongs (15) enter completely between the transfer-prong stripper sections (24), is arranged above a region (34) of the conveying surface (33) which is adjacent to the pickup device (10).

11. The field cultivating machine according to claim 1, further comprising a hold-down device (40) having a rotatable hold-down roller (41), which is arranged at least in part in front of the pickup rotor (11) in relation to the longitudinal axis (X), and a guide cover (46), which is arranged at least in part behind the pickup rotor (11) in relation to the longitudinal axis (X) and defines a conveying duct (18) for crop material between the guide cover (46) and at least one of the rotors (11, 14).

12. The field cultivating machine according to claim 11, wherein the hold-down device (40) is suspended by means of at least one hold-down device carrier (55) that is at least vertically movable relative to the rotors (11, 14).

13. The field cultivating machine according to claim 11, wherein the hold-down roller (41) and/or the guide cover (46) are individually adjustable relative to the hold-down device carrier (55).

14. The field cultivating machine according to claim 11, further comprising a plurality of guide prongs (48), which extend along the longitudinal axis (X) and are configured to guide the crop material discharged by the transfer rotor (14) in the direction of the downstream device (30), wherein an inclination of the guide prongs (48) relative to the longitudinal axis (X) is adjustable in the direction of the transverse axis (Y).

15. The field cultivating machine according to claim 14, further comprising an inclination of the guide prongs (48) relative to the longitudinal axis (X), is adjustable in the direction of the vertical axis (Z).

16. The field cultivating machine according to claim 11, wherein the hold-down device (40) has a plurality of guide prongs (48), which extend along the longitudinal axis (X) and are configured to guide the crop material discharged by the transfer rotor (14) in the direction of the downstream device (30).

17. A pickup device (10) for a field cultivating machine (1) comprising:

a pickup rotor (11) and a transfer rotor (14), which can be driven in the same direction about axes of rotation (A, B) which extend at least predominantly along a transverse axis (Y), wherein the pickup rotor (11) is configured to pick up agricultural crop material from the ground (70) by means of pickup prongs (12), to lift crop material in relation to a vertical axis (Z) and to transfer crop material to the transfer rotor (14), which is configured to take over the crop material by means of transfer prongs (15) and to transfer crop material it to a downstream device (30), which is arranged at least in part behind the pickup device (10) in relation to a longitudinal axis (X), wherein the transfer prongs (15) engage between the pickup prongs (12) in such a way that ranges of movement (C, D) of the transfer prongs (15) and the pickup prongs (12) overlap when viewed along the transverse axis (Y), wherein the pickup device (10) has a stripping device (20) with pickup-prong stripper sections (23) and pickup-prong gaps (25), which are formed therebetween in relation to the transverse axis (Y) and through which the pickup prongs (12) at least partially project, wherein the stripping device (20) has transfer-prong stripper sections (24) and transfer-prong gaps (26) formed therebetween, through which the transfer prongs (15) at least partially project, wherein, as the transfer rotor (14) rotates, the transfer prongs (15) enter between the transfer-prong stripper sections (24), and wherein, in the course of the movement of the transfer rotor (14) along the stripping device (20), a stripping angle (b), b>) between a respective part of the transfer conveying profile (19) which is adjacent to the stripper and the adjacent transfer-prong stripper section (24) is at least 80° throughout the transfer prongs (15).

* * * * *